Figure 1:
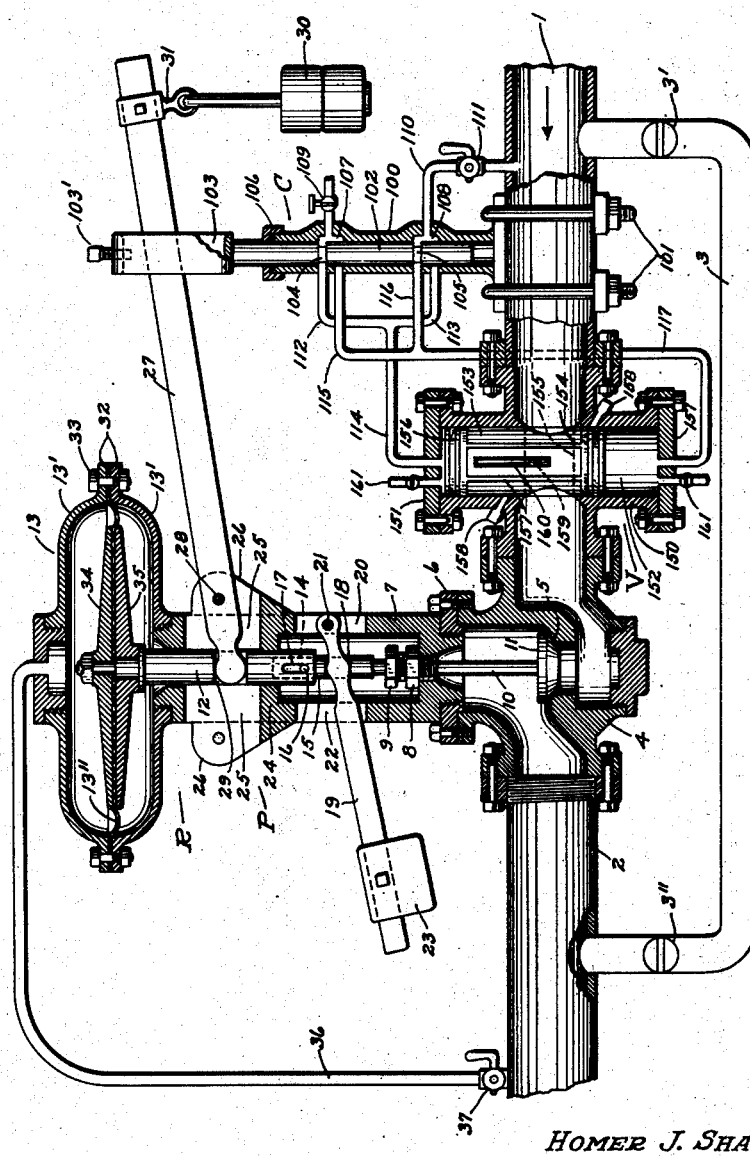

Nov. 11, 1941.  H. J. SHAFER  2,262,539
PIPE LINE SYSTEM AND MECHANISM THEREFOR
Filed Jan. 24, 1939  2 Sheets-Sheet 1

Inventor
HOMER J. SHAFER
By
Attorney

Patented Nov. 11, 1941

2,262,539

UNITED STATES PATENT OFFICE 2,262,539

PIPE LINE SYSTEM AND MECHANISM THEREFOR

Homer J. Shafer, Galion, Ohio

Application January 24, 1939, Serial No. 252,687

19 Claims. (Cl. 137—153)

My invention relates to a fluid pressure regulating system including valves to control the system and pressure operated mechanism to control the operation of the valve. The invention is particularly adapted for use in pipe line systems adapted to transport fluids, especially gas.

One object of my invention is to provide a system wherein the volume of gas flowing from a main line through a distribution line to the place of use may be controlled.

Another object of my invention is to provide a system with an improved arrangement of valves and regulators of such construction that, when consumption is increased beyond a predetermined amount, a regulator controlling the flow of gas from a main line to the distribution line may be moved to an adjusted position and accurately increase the quantity of gas supplied to the distribution line, reduction in gas consumption also causing adjustment of the regulator to proportionately reduce gas supplied to the distribution line.

Still another object of my invention is to provide an automatic operated shut-off or valve to prevent the supply of gas flowing from the main line into the distribution line in case of a breakage in the distribution line in order to prevent excessive loss of gas.

Still another object of my invention is to provide an automatic shut-off or valve to close the main line in case of a breakage in the distribution line and including means to manually control the operation of the valve when desired.

Another object of my invention is to provide an automatic shut-off or valve which will close when the pressure in a distribution line drops to or below a predetermined value.

Other objects will be disclosed as the description of my invention proceeds.

My invention resides in the new, novel and useful construction, combination and relation of parts as herein disclosed, and two embodiments of my invention are illustrated in the accompanying drawings.

In the drawings:

Fig. 1 is a view in partial section of one embodiment of my invention showing the main and distribution lines, the automatic shut-off valve, means for regulating the gas pressure in the distribution line and means controlled by the regulating means which in turn controls the operation of the valve; the main shut-off or valve is shown opened and the line in normal operating condition.

Figure 2:
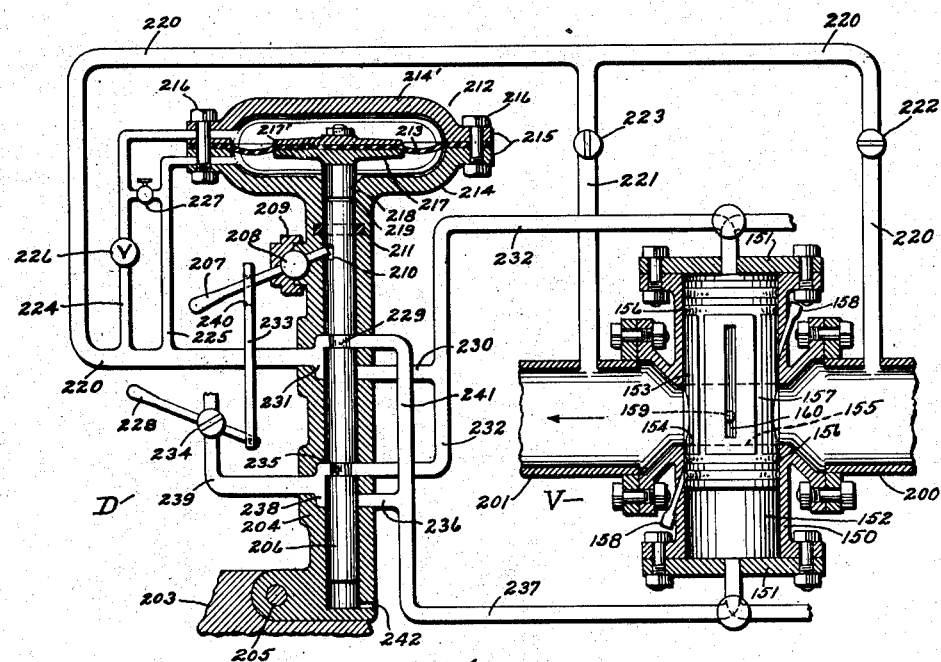

Fig. 2 is a diagrammatic view with some parts in section of another embodiment of my invention showing a supply line, an automatic shut-off or valve opened and pressure operated means for controlling the closing of the valve when the pressure in the line suddenly drops below a predetermined value as in case of a sudden large demand or in case of a break in the line; the relation of valves and other parts is such as is found when the system is in normal operation.

Figure 3:
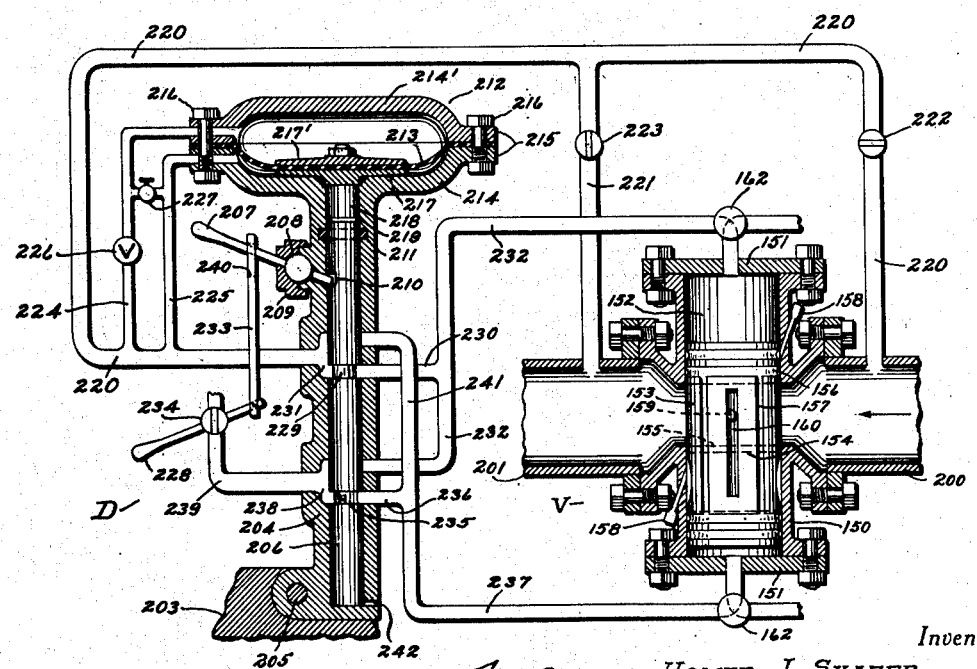

Fig. 3 is a view similar to Fig. 2 except the valve and parts are shown as when the shut-off or valve is closed and the other parts in their relative positions after having operated to close the valve.

In the embodiment of my invention shown in Fig. 1, the pipe line comprises the main high pressure line 1 shown as connected to low pressure distribution line 2. The pressures in the two lines are relatively different and may be whatsoever the system requires. A shut-off valve V is interposed between lines 1 and 2. The operation of the valve V is controlled by the control device C mounted upon the line 1 or in any other suitable manner. The operation of the control device C is effected by the pressure regulator R which is mounted between the valve V and the line 2. The pipe 1 and the line 2 are connected by a by-pass 3 in which the valves 3' and 3'' are normally closed.

The regulator body 4 is provided with a seat 5. Threadably mounted on the cap 6 is a hollow column 7 provided with a stuffing or packing box 8 and nut 9 and through which extends the valve stem 10.

The stem 10 extends vertically in the regulator body 4 and column 7 and is provided at its lower end with a valve disk 11 movable into and out of engagement with the seat 5 to close and open the regulator when the stem 10 moves vertically down or up respectively. A plunger 12 is mounted in the column 7 to slidably move up and down therein and has its upper end extending into the diaphragm housing 13 to be secured upon the upper end of the column 7. A socket 14 is formed in the lower end of the plunger 12 to slidably receive the upper end of the head 15 of the stem 10 in order to permit a limited relative movement of the plunger and valve stem before movement is imparted to the stem 10. A pin 16 is carried by the head 15 and projects into the side slots 17 formed in the opposite sides of the lower end of the plunger 12.

A slot 18 is formed in the head 15 intermediate the ends thereof and through this slot extends a lever 19 which has one end pivotally mounted in a slot 20 in the column 7 by means of a pin 21 and extends in the other direction through the slot 22 formed in the opposite side of the column.

A weight 23 is adjustably mounted on the lever 19 and tends to hold the valve disk 11 in its closed position and yieldably resists upward movement of the valve stem. By properly adjusting the weight 23, the valve disk 11 will be yieldably held upon the seat 5; a spring may be used in place of the weighted arm 19.

Above the guide 24 the column is formed at opposite sides with slots 25 each having spaced ears 26. An upper lever 27 of greater length than the lower lever 19 is pivotally mounted between one pair of ears 26 by a pin 28 and the inner end of the lever 27 is engaged by a slot 29 in the plunger 12. A weight 30 is suspended from a support 31 mounted upon the lever 27 and adjustable longitudinally thereof and urges the plunger 12 upwardly.

In view of the fact that the plunger 12 is slidably connected to the head 15 of the valve stem 10 by the slot and pin connection, it may have restricted sliding movement independent of the stem 10.

The housing 13 is formed in two parts 13', detachable relative to each other. A diaphragm 13" preferably of yieldable material is secured in the housing and held in place between the adjacent edges of the flanges 32 which firmly grip the edge of the diaphragm 13" when the bolts 33 are tightened, thus dividing the housing into two entirely separate compartments. Plates 34 and 35 are positioned on opposite sides of the diaphragm and orifice to receive the upper end of the plunger 12 which is secured thereto against relative movement. The diaphragm is clamped between the plates 34 and 35 and is movable only with the plates and plunger 12.

A glance at Fig. 1 will clearly show that, while the lever 27 urges the plunger 12 upwardly, this plunger may be forced downwardly by sufficient gas pressure in the upper portion of the housing, entering through the pipe 36 which leads from the distribution line 2 and is manually controlled by the shut-off valve 37 arranged to bleed the pipe 36 to atmosphere when closed.

By so connecting the pressure regulator R it may be held closed by gas above a predetermined pressure in the line 2 by adjusting the weight 30, but when the pressure is reduced in the line 2 to a value below said predetermined value by continual use of the gas the pressure on top of the diaphragm will be reduced and the weighted lever 27 will raise the valve disk 11 and open the regulator allowing gas to flow from the high pressure pipe 1 into the low pressure line 2. The distribution line 2 is usually of considerable diameter and may be several miles long and acts as a reservoir for gas when it has been filled and "packed" to full pressure and this supply may be drawn upon for a considerable amount of gas before the pressure therein drops to the said predetermined value.

The flow of gas from the pipe 1 into the line 2 will raise the pressure therein by replacing the gas which has been withdrawn and when the pressure has again been raised to a predetermined or normal value, the pressure on the top of the diaphragm will also be raised and the valve disk 11 will be moved downwardly and seated, closing the regulator, the weight 23 assisting in this movement.

The regulator will continue to supply gas to the line 2 until the pressure in the line 2 and the pressure above the diaphragm has increased above the said predetermined value and reached normal. The pressure in the pipe 1 is usually very high compared to that in the line 2 and the gas withdrawn from the line 2 is usually replaced quite rapidly even with a small opening of the regulator R.

If the withdrawal of gas from the line 2 continues and in increasing quantities the pressure on the diaphragm will decrease accordingly and the weighted lever 27 will open the regulator to a greater amount. If, however, the drain upon the line 2 exceeds a predetermined rate and the pressure therein falls to a predetermined low value which is considered unsafe or if there should be a sudden break in the line 2, then the lever 27 will drop to a point where it will operate the control device C which in turn will automatically effect a closing of the valve V thus shutting off completely further flow of gas into the line 2 until conditions have been adjusted to normal.

The control C which I show in Fig. 1 is a simplified form from that shown in my copending application, Serial Number 140,928, filed May 5, 1937, Patent No. 2,148,509, granted Feb. 28, 1939, of which this present application is a continuation in part.

In my copending application the control device C is arranged to operate a plurality of valves V and hence is more complicated than required to operate a single valve but in both applications the control device C operates in the same manner to effect an opening or closing of a valve of the same construction.

The control device C comprises a hollow standard 100 secured to the pipe 1 by the clamps 101 or otherwise mounted adjacent the regulator R. Mounted in the standard is a vertically slidable plunger 102. The upper end of the plunger is provided with the slot 103 through which projects the lever 27 and an adjusting screw 103'. The plunger is provided with ports comprising an upper groove 104 and a lower groove 105 which may be a transverse passage through the plunger in place of each groove. The plunger is packed at its upper end by means of the packing and packing nut 106. The standard 100 is provided with the elongated ports comprising grooves 107 and 108, the former being connected to atmosphere through the hand valve 109 which is normally opened and the latter groove connected to the high pressure pipe 1 by the pipe 110 and hand operated valve 111.

The plunger 102 is shown in its position relative to the other parts as when it has operated to effect a movement of the valve to its open position.

The standard 100 is provided with pipe connections 112 and 113 which connect to the common pipe 114 which in turn open into that end of the valve V which effects the closing of the valve when under pressure. The valve V is shown in its open position. It will be noted that the upper end of the valve is vented to the atmosphere through pipes 114 and 112, port grooves 104 and 107 and valve 109 (when open).

The standard 100 is also provided with pipe connections 115 and 116 which connect to the common pipe 117 which leads to that end of the valve V which effects the opening of the valve when under pressure. It will be noted that the lower end of the valve is connected to the pipe 1 through the pipes 117 and 116, ports 105 and 108, pipe 110 and valve 111 (when open) as shown the valve 111 is open and the lower end of the valve V is under pressure.

The valve V comprises the body 150, closed at the ends by plates 151 and through which the pipes 114 and 117 pass respectively. The body is positioned in the line as is also the pressure regulator P. The body has a cylindrical bore 152 in which is mounted a reciprocating member or piston 153 provided with a through opening 154 preferably round in cross-section which registers with an opening 155 preferably round in cross section, in the valve body 150. When the member 153 is moved to the other end of the body from that shown, the openings 154 and 155 do not register and the valve is then closed.

At each end of the piston 153 is a plurality of circumferential grooves 156 preferably filled with a grease. Extending longitudinally and connecting the inner grooves are a plurality of grooves 157 also filled with grease. These grooves tend to check or hold back any leakage of gas or other fluid from end to end of the valve and also leakage which tends to pass around the piston 153. The grooves may be filled with grease by means of grease cups or fittings 158 adjacent the center of the body or otherwise conveniently placed and communicating with the grooves.

The reciprocating piston 153 is prevented from rotating by a dowel 159 which projects through the valve body and into longitudinal grooves; the dowel 159 shown in Fig. 1 is projecting upwardly from the under side of the valve body into a groove in the lower side of the piston and corresponding to the groove 160 in the upper side of the piston. The dowels and cooperating grooves it will be noted are so placed as not to cause leakage in any manner between the piston 153 and the surface of the bore 152. The seat between the body and reciprocating piston can be made very close as is the case of engine cylinders and pistons. The grease in the grooves not only tends to prevent leakage but also lubricates the relative movable parts which movement, however, is quite infrequent and only in case of emergency or periodic tests.

Returning now to the operation of the control device C and valve V, in case the line 2 should break, the pressure above the diaphragm 13'' will drop rapidly and materially and when the pressure in the line 2 has dropped below the aforesaid predetermined value the lever 27 will drop sufficiently to engage the lower end of the slot 103 moving the plunger 102 downwardly until the port 104 is opposite the pipe 115 and connects it to atmosphere through the port 107, and the port 105 is opposite the pipe 113 and connects it to the high pressure pipe 1 through the slot 108, pipe 110 and valve 111 which is normally opened. This permits high pressure gas to flow through the pipe 114 into the upper end of the bore 152 and move the member 153 to the lower end of the bore which is now open to the atmosphere and thus close the cut-off valve V.

When the defect in the line 2 has been repaired, an operator will return to the apparatus shown in Fig. 1 and open the by-pass valves 3' and 3'' which permits gas to flow from the pipe 1 into the line 2 until the line 2 is "packed" and the pressure has been built up sufficiently to move the diaphragm 13'' and plunger 12 downwardly which will raise the lever 27 indicating that the line is "packed" to normal. The operator will then raise the lever 27 manually until it engages the upper end of the slot 103 and moves the plunger 102 to the position shown in Fig. 1 at which time gas will flow into the lower end of the bore 152 and move the cylinder 153 to its open position thus placing the system in normal operating condition as soon as the valves 3' and 3'' are closed. This extra upward movement of the lever 27 can be made without affecting the seating of the valve disk 11 in view of the slot 17 in the piston 12.

By properly locating the ports 107 and 108 they may be placed in the side of the plunger 102 and in which case the ports will move with the plunger and connect the outlet and inlet ports in the same manner as described above and the valve will be operated as described.

At each end of the valve V is a pipe and valve 161. The valve is normally closed, but if it is desired to move the piston 153 and there is no pressure in the pipe 1, then a hand pump may be applied to the pipe and valve 161 and air pressure forced into the proper end of the valve V.

The embodiment shown in Fig. 1 and described above combines a pressure regulating valve which maintains pressure in the distribution line under normal conditions with an automatic cut-off valve which operates in an emergency to close the passage between the high pressure and low pressure lines.

In the embodiment shown in Figs. 2 and 3 the combination is arranged to act simply as an automatic shut-off valve in case of a lowering of the pressure in the distribution line below a predetermined value as, for instance, in case the distribution line breaks at some point on either side of the valve V. This arrangement does not depend upon being connected to a high pressure and a low pressure line for its operation but upon a sudden reduction in pressure in the line below a predetermined value at the point where the apparatus is connected to the line and is strictly an automatic cut-off or closing valve for emergency conditions.

In Fig. 2 the arrangement shows the relative position of the parts when the pipe line is in normal operating condition and in Fig. 3 when the pipe line has broken and the supply of gas to the broken line cut off. In this arrangement the pressure in the pipe line will be the same on both sides of the cut-off valve when it is open. Referring to Fig. 2, the valve V is of the same construction as shown in Fig. 1 and described above and the parts are numbered the same, hence a description of the valve V in Fig. 2 would only be a repetition of that of the valve in Fig. 1. Connected to the valve V is the inlet pipe 200 and the outlet pipe 201. These pipes represent the distribution line or any other line in a gas system controlled by the valve V and may extend for several miles in each direction from the valve V.

Mounted upon a suitable support 203 is a control device D comprising a hollow standard 204 secured thereto by a bolt 205. Slidably positioned in the hollow of the standard is a plunger 206 which is arranged to be moved up or down by means of the handle 207 which is pivoted to the standard by a ball and socket joint 208 and held by the threaded cap and nut 209. The bearing surface of the ball may be coated with a thin layer of Babbitt metal or other yieldable metal which will seat against the opposing bearing surface and prevent leakage. The end of the handle 207 extends into a recess 210 in the side of the plunger. The standard is provided with packing 211 which may be of any suitable style as, for instance, a U leather or rubber packing 211 positioned in the standard as shown or in a groove in the plunger.

At the upper end of the standard 204 is a housing 212 in which is mounted a diaphragm 213. The housing is of two parts 214 and 214' provided with flanges 215 between which is clamped the edge of the diaphragm 213 by cap screws 216. The part 214 may form either an integral part of the standard or be secured thereto, as in the same manner as the corresponding part 13' in Fig. 1 is secured to the standard 7.

Plates 217 and 217' are secured on opposite sides of the diaphragm and are each provided with an orifice to receive the end of the short plunger 218 which is slidable in the standard. The plunger 206 is not connected with the plunger 218 but separated by a cut or slot 219 thus there may be some movement of the diaphragm 213 and plunger 218 without the plunger 218 moving the plunger 206.

Since the pressure on the lower side of the diaphragm under normal conditions will be the same as in that of the pipe 220 which connects to the standard as shown, the packing 211 may be omitted under some conditions, since any leakage which may occur between the plunger 206 and standard 204 will finally equalize the pressure throughout the standard 204, also in both ends of the bore 152 and the lower side of the diaphragm and such equalized pressure will have no effect upon the normal setting of the parts. This pressure throughout the standard 204 may be avoided by venting as later described.

When the system is operating under normal conditions there is equal pressure upon both sides of the diaphragm but when the pressure above the diaphragm exceeds that below the diaphragm then the plunger 218 is moved downward and if the difference in pressure is enough then the plunger 218 contacts the plunger 206 and moves the latter downward in which case a different setting of the parts takes place as shown in Fig. 3.

The operation of my invention shown in Figs. 2 and 3 is as follows—The pipe 200 is connected to the pipe 201 by the by-pass pipes 220 and 221 including the valves 22 (shown shut) and 223 (shown open) respectively, which permits taking gas for the control device D from either pipe 200 or 201 and also permits by-passing the gas if desired when the valve V is closed.

The control device is shown as taking gas from pipe 201 through the pipe 221, valve 223 and pipe 220 and from the latter two lines branch, namely, 224 connecting into the upper side of the diaphragm housing and 225 connecting into the lower side of the housing. The valve 226 is a needle valve whereby the rate of flow of gas (or volume per unit of time) through the pipe 224 in either direction may be nicely adjusted, and it is upon the adjustment of this valve 226 that the operation of the control device depends in case of an excessive or sudden lowering of pressure in the pipe line as in case of a break. The by-pass valve 227 is normally closed but when open, by manual operation, equalizes the pressure both above and below the diaphragm and is of convenience when resetting the control device D as later explained.

Assuming that the gas system has been working normally and in which case the valve V and control device D will be as shown in Fig. 2 and that a break occurs in the pipe 201 at a distance from the valve V, then the pressure will drop rapidly in the pipe 201 and accordingly in the pipe 220 and 225 which will reduce the pressure on the under side of the diaphragm at the same rate as in the pipe 220 and 201 but on account of the needle valve 226 being set for a very slow passage of the gas through the pipe 224, the pressure on the upper side of the diaphragm will remain above that of the lower side for a considerable period of time and during that period the diaphragm will be depressed as the pressure below the diaphragm reduces and the plunger 218 will engage the plunger 206 and move it longitudinally to its lower position as shown in Fig. 3, when a predetermined difference of pressure has been reached in the housing 212.

When the plunger 206 of the device D reaches the position in Fig. 3 the port or groove 229 in the plunger 206 will connect with the pipe 230 and pressure will be applied to the upper end of the valve V from the pipe 220 through the elongated port or slot 231, port or groove 229, pipes 230 and 232 to the valve V. At the same time the handle 207 will be raised which will raise the rod 233 which acts upon the valve 234 to open the same and release the pressure in the lower end of the valve bore 152 as the port or groove 235 will register with the pipe 236 and the gas in the lower end of the valve V will flow to atmosphere through the pipes 237 and 238, port 235, elongated slot 238, pipe 239, and valve 234. The pressure upon the upper end of the piston 153 will move it to the closed position shown in Fig. 3.

When it is desired to open the valve V after being closed, the operator opens the valve 227 which permits equalization of the pressure on opposite sides of the diaphragm and permits him to lower the handle 207 which raises the plungers 206 and 218 to the position shown in Fig. 2. This leaves the vent valve 234 open as the handle 207 passes through the slot 240 in the upper end of the rod 233 and it merely moves from the upper end of the slot 240 to the lower end thereof when raised in the manner stated. To close the valve 234 the operator moves the handle 228 upwardly which closes the valve and brings the upper end of the slot in substantial engagement with the handle 207 as shown in Fig. 2, ready to repeat the operation of opening the valve 207. It will be appreciated that the valve 234 is automatically opened to atmosphere when the piston 206 moves to its shut off position to vent the valve V to the atmosphere but the valve 234 is closed manually after the piston 206 has been moved to its open position and may remain open if the operator so elects.

The operator now closes the valve 227 and as pressure builds up in the pipe 201 it also builds up in the pipes 221 and 220 and equally as rapidly against the lower side of the diaphragm but the pressure builds up very slowly on the upper side of the diaphragm on account of the needle valve 226. As pressure builds up in the line 220 it also builds up in the lower end of the bore 152 through the elongated port 231, port 229, pipes 241 and 237 thus moving the piston 153 to its open position (see Fig. 2). The diaphragm will assume its normal position as the pressure builds up on the upper side thereof until it equals that on the lower side.

It might be of advantage under some conditions to provide a small port 242 at the lower end of the standard 204 to relieve back pressure when the plunger 206 is moved downwardly or in place of the open port 242 a spring operated relief valve may be used which opens at a pressure slightly above that of line pressure.

It will be recognized that the periphery of the piston 153 is circular in a plane at right angles to the longitudinal axis of the slidable piston except where cut by the grooves 157 and 160 and snuggly fits the bore 152.

In Fig. 3 are shown valves 162 which may be two-way valves and normally closed to atmosphere but when open to atmosphere a pressure by means of a hand pump may be applied to the end of the piston 153 and force it to its other position, as for instance from a closed position (Fig. 3) to an open position (Fig. 2); of value when desired to move the piston 153 and there is no pressure in the system.

The member C or D may be formed as a part, either integral or separable, of the body of the valve V.

The normal position of the control device C or D is vertical but they may be placed in a horizontal position.

The positions and relations of the parts associated with the control devices C and D whereby the fluid pressure is controlled with respect to the conduit body thereto and to the valve V, may be varied from those shown and described without departing from my inventions.

If desired the piston may be made solid retaining the transverse opening 154, but this is impractical as it makes a piston which is unreasonably heavy; the piston may be made hollow with the ends closed by transverse walls of metal and the opening 154 through the side wall of the piston which permits the gas pressure to be equalized through the interior of the piston; or the piston may be hollow with the opening 154 surrounded by a transverse wall which shuts the opening off from the other interior parts of the piston and a transverse wall at each end of the piston, this produces a piston which has a closed recess at each end. When the piston is made hollow and provided with relatively thin walls, I prefer to provide interior struts to support the walls from external or internal pressure which may be several hundred pounds per square inch.

The normal position of the valve V is with the longitudinal axis of the piston 153 in a horizontal position.

In the claims I refer to the position of the plunger 206 as shown in Fig. 2 as its "open" position and as shown in Fig. 3 as its "closed" position, since in the former position the valve V is open and with the plunger 206 in the latter position the valve is in the closed position.

In the claims I refer to the line or conduit supplying fluid pressure to the control devices C and D as the "supply line" or "supply conduit," and those supplying fluid pressure to the diaphragm housing as the "pressure lines" or "pressure conduits"; and the lines to the valve V from the control devices C and D as the "valve conduits."

By "fluid pressure" I refer to such fluids under pressure as gas, air, water, oil, volatile liquids, etc.

Modifications will suggest themselves to those skilled in the art from the disclosure I have herein made, and, therefore, I wish to be limited only by my claims.

I claim:

1. In a pipe line control apparatus, in combination a valve operable by fluid pressure to either its open or to its closed position, a fluid pressure operated control device operable to two positions to control the movement of the valve to its open position or to its closed position, means connecting the control device and the valve to conduct fluid pressure to the valve to operate the valve to either its open position or to its closed position depending upon the position of the control device, and means connecting the control device to the pipe line to supply fluid pressure to the control device and to the valve whereby the valve is operated to its closed position when the control device is in one position and the pressure in the pipe line suddenly drops to a predetermined value and a second normally closed valve associated with the control device to control the flow of fluid pressure through the pipe line and provided with means to connect it to the pipe line whereby the said second valve is opened and closed while the first said valve is open to control the flow of fluid pressure through the pipe line as the pressure varies between the aforesaid predetermined low value and the normal pressure.

2. A pipe line shut-off device comprising in combination a valve having a body provided with an inlet and an outlet to which the pipe line may be connected, a bore, a reciprocating piston mounted in the bore and movable longitudinally thereof, a transverse passage through the piston to register with the inlet and outlet openings when the piston is at one end of its stroke only, the piston operable by fluid pressure to either of its two positions when fluid pressure is applied to the proper end of the piston, a control device to control the flow of fluid pressure to the ends of the bore to secure the proper operation of the piston, the said control device comprising an elongated hollow standard provided with two pairs of spaced outlet ports, the ports of each pair connected to a single conduit leading to the ends of the valve bore respectively, the standard also provided with an inlet port arranged to connect to a supply line connected in turn to the pipe line to supply fluid pressure to the control device and to the shut-off device, a reciprocating plunger mounted in the standard and having a "closed" position and an "open" position, ports associated with the plunger to alternately communicate with the pairs of outlet ports and one plunger port to communicate with the inlet port in both positions of the plunger and the other plunger port to communicate in both its positions with a third outlet port associated with the standard and leading to the atmosphere, whereby when the plunger is in its "open" position and the shut-off device connected to a pipe line, fluid pressure will flow through the conduit connected to one pair of outlet ports and to one end of the valve bore and act upon that end of the valve piston to move it to its open position and also fluid pressure will flow through the conduit connecting the other pair of outlet ports to the other end of the valve bore and act upon that end of the valve piston to move it to its closed position when the reciprocating plunger is in its "closed"

position, the said third outlet being connected to that pair of outlet ports which is free of fluid pressure when the other pair of outlet ports is under pressure to vent the conduit connected to the former pair of ports to atmosphere, the control device also provided with means operated and controlled by the fluid pressure in the supply line to operate the plunger to its "closed" position when pressure in the supply line drops below a predetermined value and means adapted to connect the supply line to the last said means whereby fluid pressure in the supply line is conducted to the said means.

3. An automatic closing valve for a pipe line comprising a valve body provided with a transverse passage and a bore transverse to the passage, a piston mounted in the bore and movable longitudinally in said bore and provided with a transverse opening whereby the passage through the body is alternately opened and closed as the piston moves longitudinally, a fluid pressure operated control device adapted to be connected to the pipe line to control the supply of fluid to and the movement of, the piston, means connecting the control device and the ends of the bore to conduct the fluid under pressure to the valve to act upon the ends of the piston to move it to either its open or its closed position, a fluid pressure operated actuator for said control device, conduits connecting said actuator with said pipe line, means interposed in one of said conduits to produce a slower rate of flow of the fluid pressure in that conduit than in the other conduit to and from said actuator to create a differential in pressure upon said actuator whereby the control device is operated to its closed position to effect a closing of the valve when pressure in the pipe line falls below a predetermined value.

4. In a pipe line control system of the class wherein a control device controls the actuating fluid pressure to a fluid pressure actuated valve to open and close the same and a diaphragm device having a chamber on each side of the diaphragm to operate the control device, the combination with the diaphragm device of conduit means to connect each chamber to the pipe line to provide a substantially balanced condition of the diaphragm under normal operating conditions and flow control means associated with the conduit means to reduce the rate of flow of fluid pressure from one chamber to a lower rate than the rate of flow from the other chamber when the pressure suddenly drops in the pipe line below a predetermined value whereby the diaphragm is depressed and the control device operated to its closed position and the valve to its closed position.

5. In a pipe line control system of the class wherein a control device controls the actuating fluid pressure to a fluid pressure actuated valve to open and close the same and a diaphragm device having a chamber on each side of the diaphragm to operate the control device, the combination with the diaphragm device of conduit means to connect each chamber to the pipe line to provide a substantially balanced condition of the diaphragm under normal operating conditions and flow control means associated with the conduit means to reduce the rate of flow of fluid pressure from one chamber when the pressure suddenly drops in the pipe line below the rate of flow from the other chamber whereby the diaphragm is depressed and the control device operated to its closed position and the valve to its closed position and a by-pass connecting the conduit means between the diaphragm device and the flow control means to equalize the pressure between the chambers for the purpose described.

6. In a pipe line control apparatus, in combination a valve operable by fluid pressure to either its open or to its closed positions, a control device operable to two positions to control the movement of the valve to its open position or to its closed position and fluid pressure operated means to operate the control device to its closed position and having a lost-motion connection with the control device whereby the fluid pressure operated means may fluctuate within predetermined limits without operating the control device, means connecting the control device and the valve to conduct fluid under pressure to the valve to operate the valve to either its open position or to its closed position depending upon the position of the control device, and means whereby the control device may be connected to the pipe line to supply fluid pressure to the control device and to the valve to operate the valve to its closed position when the pressure in the pipe line suddenly drops to a predetermined value while the control device is in its open position and the manually operated means to operate the control device to its open position to operate the valve to its open position.

7. A fluid pressure control device comprising a hollow standard, means to support the standard, a reciprocating plunger mounted in the standard, a pair of spaced outlet ports and an inlet port associated with the standard, a port associated with the inlet port and movable to two positions to register the inlet port with one of the outlet ports depending upon the position of the plunger, means to automatically vent the other outlet port to atmosphere, a housing associated with the standard and a flexible diaphragm mounted in the housing, means operated by the diaphragm to engage the plunger and to move the plunger to register the inlet port with one outlet port from a position in which the inlet port registers with the other outlet port, means whereby the housing may be connected to a common source of fluid pressure to supply a fluid pressure to the housing on each side of the diaphragm, means associated with the last said means to check the rate of flow of fluid pressure into and out of one side of the housing as compared to the flow into and out of the other side whereby an unbalanced pressure condition results when the fluid pressure suddenly reduces in said common source of fluid pressure, the result of said differential in pressure causing the diaphragm to move in the direction of least pressure and to move the plunger to change the registration of the ports.

8. A fluid pressure control device comprising a hollow standard, means to support the standard, a reciprocating plunger mounted in the standard, a pair of spaced outlet ports and an inlet port associated with the standard, a port associated with the inlet port and movable to alternately register the inlet port with the outlet ports with the reciprocation of the plunger, a housing associated with the standard and a flexible diaphragm mounted in the housing, means operated by the diaphragm to engage the plunger and to move the plunger to register the inlet port with one outlet port from a position in which the inlet port registers with the other outlet port, means whereby the housing may be connected to a common source of fluid pressure to supply a fluid pressure to the housing on each side of the diaphragm, means associated with the last said means to check the rate of flow of fluid pressure into and out of one side of the housing as compared to the flow into and out of the other side whereby an unbalanced pressure condition results when the fluid pressure suddenly reduces in said common source of fluid pressure, the result of said differential in pressure causing the diaphragm to move in the direction of least pressure therein and to move the plunger to change the registration of the ports and manually manipulated means to return the plunger to its former registration of ports.

9. A control device for use with a main source of fluid pressure comprising a body, a valve member associated with the body and movable to an "open" and to a "closed" position and provided with a port, the body provided with two outlet ports and an inlet port, the port in the valve member registering at all times with one of the outlet ports and the inlet port depending upon the position of the valve member, fluid pressure operated means, means interposed between the said means and the valve member to automatically move the valve member to its "closed" position, the said operated means provided with two fluid inlets connected to a common source of fluid pressure and one inlet provided with means to affect the rate of flow of fluid therein whereby the said operated means and both its inlets will be subjected to substantially equal pressure while the pressure in the common source is substantially normal but the said operated means and its inlets will be subjected to a differential in pressure when the pressure in the common and main sources of supply suddenly drops below a predetermined value to operate the intermediate means to in turn operate the valve member to its "closed" position, manually operable means to move the valve member to its open position and means associated with the manually operable means and with the outlets and operable by the movement of the valve member to its "closed" position to automatically vent one of the outlets from the body to atmosphere.

10. A control device for use with a main source of fluid under pressure comprising a body, a movable valve member associated with the body and having a port, the body provided with two outlet ports and an inlet port, the inlet port registering at all times with the port in the valve member and with one of the outlet ports depending upon the position of the valve port relative to the inlet port and the outlet ports, operating means to automatically move the valve member to one of its positions, the operating means comprising a housing divided into two chambers by a movable member arranged to operate the valve member, the chambers provided with two fluid inlets connected to a common source of fluid pressure and one inlet provided with a needle valve to affect the rate of flow of fluid therein whereby the operating means and both its inlets will be subjected to equal pressure while the pressure at the common source is substantially constant but the said operating means and its inlets will be subjected to a differential in pressure when the pressure in the common and main sources of supply suddenly drops below a predetermined value and the other outlet port from the body being vented to atmosphere when the aforesaid inlet port registers with the other outlet port from the body.

11. A fluid pressure operated device comprising a housing, a diaphragm positioned in said housing and dividing it into two independent chambers, conduits leading to the chambers one to each chamber and each conduit adapted to receive fluid under pressure from a common source and means associated with one conduit for restricting the size of the passage therethrough to a size less than that of the other conduit to reduce the rate of flow therein as compared with that in the other conduit whereby the pressure in one chamber will remain above that in the other chamber when the pressure at the common source of supply drops at a rate which will effect a greater drop in the uncontrolled conduit than in the controlled conduit.

12. The combination with a fluid pressure line conduit, of a control device comprising a reciprocating plunger, means forming a passage connecting said control device with said conduit to apply pressure from said conduit to move said plunger to one position of adjustment, a pressure actuated valve for closing said conduit and means including ports operated by said plunger for controlling fluid pressure applied to said valve to cause said valve to move to its closed position when said plunger is in said position of adjustment, said passage having a reservoir space connected therewith and connected by a restricted opening with said conduit so that upon rapid drop of pressure in said conduit the fluid in said reservoir space will be retained therein a sufficient length of time to move said plunger to the aforesaid position of adjustment and cause said valve to be closed, but upon slower drop of pressure in said conduit said valve will not be closed.

13. The combination with a fluid pressure line conduit, of a control device comprising a reciprocating plunger, means forming a passage connecting said control device with said conduit to apply pressure in one direction to said plunger to move said plunger to its "closed" position, means forming a second passage connecting said control device with said conduit to apply pressure to said plunger in opposition to the pressure applied through said first named passage to retain said plunger in status quo, said first named passage having a reservoir space connected therewith and means for preventing quick return of fluid from said reservoir space to said conduit, said second named passage providing relatively free flow of fluid therethrough to and from said conduit so that upon sudden drop of pressure in said conduit said plunger will be subjected to a differential pressure tending to move it to its "closed" position, but upon slower drop of pressure in said conduit said plunger will not be actuated and a valve controlled by said plunger for closing said conduit when said plunger is moved to its "closed" position.

14. The combination with a fluid pressure line conduit, of a control device comprising a reciprocating plunger, means forming a passage connecting said control device with said conduit to apply pressure in one direction to said plunger to move said plunger to its "closed" position, means forming a second passage connecting said control device with said conduit to apply pressure to said plunger in opposition to the pressure applied through said first named passage to retain said plunger in status quo, said first named passage having a reservoir space connected therewith and means for preventing quick return of fluid therefrom to said conduit while said second named passage provides relatively free flow of fluid therethrough to and from said conduit so that upon sudden drop of pressure in said conduit said plunger will be subjected to a differential pressure tending to move it to its "closed" position but upon slower fall of pressure in said conduit said plunger will not be actuated, a valve controlled by said plunger for closing said conduit when said plunger is moved to its "closed" position, manually controlling means for equalizing the pressure on said plunger and manually operated means for restoring said plunger to an "open" position to cause said valve to be moved to open said conduit.

15. The combination with a fluid pressure line conduit, of a fluid pressure actuated valve for closing said conduit, a device for controlling flow of fluid pressure supplied from said conduit to actuate said valve, said control device having an exhaust outlet, supplemental means for closing said exhaust outlet to prevent seepage therethrough and means automatically actuated by said control device for opening said supplemental closing means when said control device is operated to effect closing of said valve.

16. The combination with a fluid pressure line conduit, of a fluid pressure actuated valve for closing said conduit, a device for controlling the flow of fluid pressure from said conduit to actuate said valve, means forming a passage for supplying fluid pressure to said control device to actuate said device to effect closing of said valve, said passage having a reservoir connected therewith, means forming a second passage from said conduit to said control device to supply pressure to counteract the pressure supplied by said first passage, means for preventing rapid return of fluid pressure from said reservoir to said conduit when the pressure in said conduit is rapidly lowered so that the fluid pressure from said reservoir acts on said control device to effect closing of said valve, said control device having an exhaust outlet, a supplemental valve for closing said exhaust outlet and means automatically actuated by said control device for opening said supplemental valve when said control device is operated by fluid pressure from said reservoir to effect closing of said valve.

17. The combination with a fluid pressure line conduit, of a fluid pressure actuated valve for closing said conduit, a device responsive to a sudden drop in pressure in said conduit for controlling flow of pressure supplied from said conduit for closing said valve, said device being unresponsive to restoration of pressure in said conduit to effect opening of said valve, and manually controlled means for effecting operation of said device to cause said valve to be reopened.

18. The combination with a fluid pressure line conduit, of a fluid pressure actuated valve in said conduit, a device for controlling flow of pressure fluid supplied from said conduit to actuate said valve, said control device having an exhaust outlet, supplemental means for closing said exhaust outlet to prevent leakage therethrough when exhaust from said control device is not required to effect operation of said valve, a handle for operating said control device and means connected with said handle for operating said supplemental closing means.

19. The combination with a fluid pressure line conduit, of a fluid pressure actuated valve in said conduit, a device for controlling flow of pressure fluid supplied from said conduit to actuate said valve, said control device having an exhaust outlet, supplemental means for closing said exhaust outlet to prevent leakage therethrough when exhaust from said control device is not required to effect operation of said valve, and means operatively connected with said control device for opening said supplemental closing means to permit exhaust from said control device when required for operation of said valve.

HOMER J. SHAFER.